US008213616B2

(12) United States Patent
Bloch et al.

(10) Patent No.: US 8,213,616 B2

(45) Date of Patent: Jul. 3, 2012

(54) SYSTEMS AND METHODS FOR PROVIDING OPPORTUNISTIC SECURITY FOR PHYSICAL COMMUNICATION CHANNELS

(75) Inventors: Matthieu Ratislav Bloch, Prevessin-Moens (FR); Miguel Raul Dias Rodrigues, Vila Nova de Gaia (PT); Joao Francisco Cordeiro de Oliveira Barros, Oporto (PT); Steven William McLaughlin, Decatur, GA (US)

(73) Assignees: Georgia Tech Research Corporation, Atlanta, GA (US); Cambridge Enterprise Limited, Cambridge (GB); Universidade Do Porto, Oporto (PT)

( * ) Notice: Subject to any disclaimer, the term of this patent is extended or adjusted under 35 U.S.C. 154(b) by 339 days.

(21) Appl. No.: 12/441,737

(22) PCT Filed: Sep. 18, 2007

(86) PCT No.: PCT/US2007/078734

§ 371 (c)(1), (2), (4) Date: Jan. 29, 2010

(87) PCT Pub. No.: WO2008/036633

PCT Pub. Date: Mar. 27, 2008

(65) Prior Publication Data

US 2010/0128877 A1 May 27, 2010

Related U.S. Application Data

(60) Provisional application No. 60/845,415, filed on Sep. 18, 2006.

(51) Int. Cl.
*H04L 9/00* (2006.01)

(52) U.S. Cl. ............ 380/268; 380/43; 380/44; 380/284; 714/752; 714/755

(58) Field of Classification Search .................. 380/268, 380/43–44, 284; 714/752, 755
See application file for complete search history.

(56) References Cited

U.S. PATENT DOCUMENTS

| | | | | |
|---|---|---|---|---|
| 6,931,128 | B2 | 8/2005 | Roberts | |
| 7,035,380 | B1 * | 4/2006 | Bingel et al. | 379/22.03 |

(Continued)

OTHER PUBLICATIONS

Tanaka, A.; Fujiwara, M.; Yoshino, K.-i.; Takahashi, S.; Nambu, Y.; Tomita, A.; Miki, S.; Yamashita, T.; Wang, Z.; Sasaki, M.; Tajima, A.;High-Speed Quantum Key Distribution System for 1-Mbps Real-Time Key Generation; Quantum Electronics, IEEE Journal of Issue Date: Apr. 2012 vol. 48 Issue: 4 on pp. 542-550.*

Zhang, Junwei, Cooperative wireless communications: the impact of channel uncertainty and physical-layer security considerations;The University of Nebraska—Lincoln, 2011 , 195 pages.*

(Continued)

*Primary Examiner* — Thanhnga B Truong
*Assistant Examiner* — Angela Holmes
(74) *Attorney, Agent, or Firm* — Thomas, Kayden, Horstemeyer & Risley, LLP

(57) ABSTRACT

Systems and methods of providing opportunistic security for physical communication channels are disclosed. One disclosed method is for opportunistic secure communication on a main channel between a sender device and a receiver device when an eavesdropper device is listening on an eavesdropper channel. This example method includes transmitting, in a first time period in which signal quality on the main channel is better than signal quality on the eavesdropper channel, symbols that are randomly selected from a set of symbols. The method also includes transmitting, in a second time period in which signal quality on the main channel is not better than signal quality on the eavesdropper channel, coding information associated with the randomly selected symbols. The method also includes reconciling the randomly selected symbols using the coding information.

24 Claims, 12 Drawing Sheets

U.S. PATENT DOCUMENTS

| | | | | |
|---|---|---|---|---|
| 7,929,409 | B2 * | 4/2011 | Chitrapu et al. .............. | 370/208 |
| 2003/0016770 | A1 * | 1/2003 | Trans et al. ................... | 375/346 |
| 2006/0075241 | A1 | 4/2006 | Deguillaume et al. | |
| 2008/0320362 | A1 * | 12/2008 | Taubin et al. ................. | 714/755 |

OTHER PUBLICATIONS

Edman, Matthew;Cryptographic security in wireless networks via physical layer properties; Rensselaer Polytechnic Institute, 2011 , 141 pages.*

* cited by examiner

SYSTEMS AND METHODS FOR PROVIDING OPPORTUNISTIC SECURITY FOR PHYSICAL COMMUNICATION CHANNELS

CROSS REFERENCE TO RELATED APPLICATIONS

This application is the National Stage of International Application No. PCT/US2007/078734 filed Sep. 18, 2007, which claims the benefit of U.S. Provisional Application No. 60/845,415 filed Sep. 18, 2006, which are hereby incorporated by reference in their entirety.

FIELD OF THE DISCLOSURE

The present disclosure relates to data communication, and more specifically, to opportunistic security for communication channels.

BACKGROUND

The conventional method of providing secure communication over a channel uses cryptography. Cryptography relies on the existence of codes that are “hard to break”: that is, one-way functions that are believed to be computationally infeasible to invert. Therefore, cryptography is vulnerable to an increase in computing power a, the development of more efficient attacks. Furthermore, the assumptions about the hardness of certain one-way functions have not been proven mathematically, so cryptography is vulnerable if these assumptions are incorrect.

Another weakness of cryptography is the lack of no precise metrics or absolute comparisons between various cryptographic algorithms, showing the trade off between reliability and security as a function of the block length of plaintext and ciphertext messages. Instead, a particular cryptographic algorithm is considered “secure” if it survives a defined set of attacks, or “insecure” if it does not.

Cryptography as applied to some media (e.g., wireless networks) also requires a trusted third party as well as complex protocols and system architectures. Therefore, a need exists for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

SUMMARY

Figure 1:
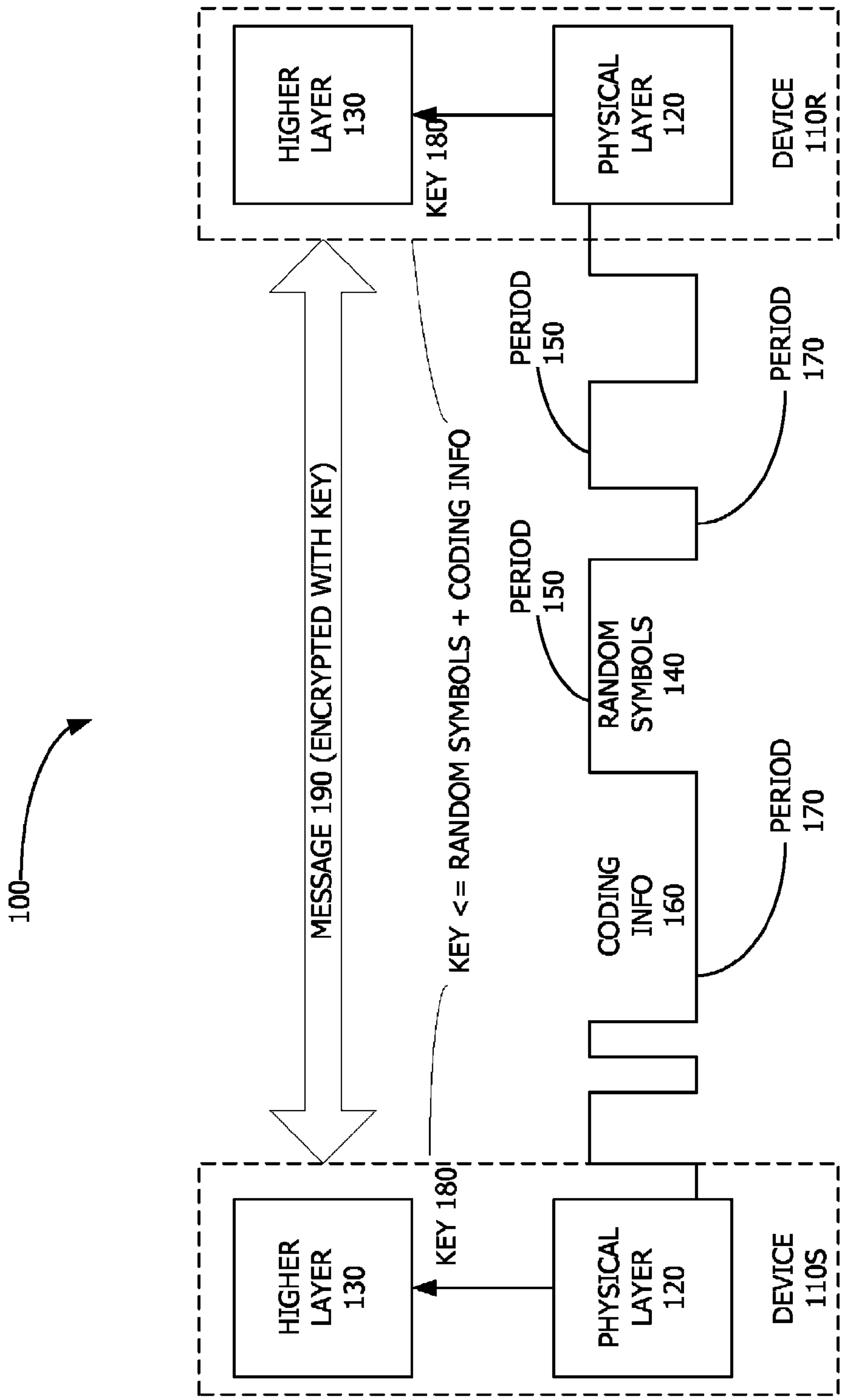
FIG. 1 is a block diagram of an environment in which one embodiment of a system and method for providing opportunistic security for physical communication channels is located.

Systems and methods of providing opportunistic security for physical communication channels are disclosed. One disclosed method is for opportunistic secure communication on a main channel between a sender device and a receiver device when an eavesdropper device is listening on an eavesdropper channel. This example method includes transmitting, in a first time period in which signal quality on the main channel is better than signal quality on the eavesdropper channel, symbols that are randomly selected from a set of symbols. The method also includes transmitting, in a second time period in which signal quality on the main channel is not better than signal quality on the eavesdropper channel, coding information associated with the randomly selected symbols. The method also includes reconciling the randomly selected symbols using the coding information.

One disclosed system is for opportunistic secure communication on a main channel between a sender device and a receiver device when an eavesdropper device is listening on an eavesdropper channel. This example system includes means for transmitting, in a first time period in which signal quality on the main channel is better than signal quality on the eavesdropper channel, symbols that are randomly selected from a set of symbols. The system also includes means for transmitting, in a second time period in which signal quality on the main channel is not better than signal quality on the eavesdropper channel, coding information associated with the randomly selected symbols. The system also includes means for reconciling the randomly selected symbols using the coding information.

Another disclosed method is for opportunistic secure communication on a main channel between a sender device and a receiver device when an eavesdropper device is listening on an eavesdropper channel. This example method includes transmitting, in a first time period, symbols that are randomly selected from a set of symbols. The method also includes transmitting, in a second time period, coding information associated with the randomly selected symbols. The method also includes reconciling the randomly selected symbols using the coding information. The first and second time periods are distinguished by relative signal quality on the main channel and on the eavesdropper channel.

Another system is for opportunistic secure communication on a main channel between a sender device and a receiver device when an eavesdropper device is listening on an eavesdropper channel. This system includes a physical layer component and a higher-than-physical-layer component. The physical layer is configured to distill a key from symbols and coding information that are presented on the main channel during two different time periods. The higher-than-physical-layer component is configured to encrypt using the distilled key. The two different time periods are distinguished by relative signal quality on the main channel and on the eavesdropper channel.

Another system is for opportunistic secure communication on a main channel between a sender device and a receiver device when an eavesdropper device is listening on an eavesdropper channel. This system includes a physical layer component and a higher-than-physical-layer component. The physical layer is configured to generate a first key in a first generation period and to generate a second key during a second generation period. The higher-than-physical-layer component is configured to encrypt in a first encryption period with the first key and to encrypt in a second encryption period with the second key. The physical layer component is further configured to generate each of the first and the second keys from symbols and coding information that are presented on the main channel during two different sub-periods contained within the respective generation periods. The two different time periods are distinguished by relative signal quality on the main channel and on the eavesdropper channel.

DETAILED DESCRIPTION

Symmetric encryption uses a key to transform a message into a form that is unreadable to anyone that does not have the key. Since the key itself is a shared secret, this form of encryption relies on a method of providing the sender's key to the receiver in a secure manner. The systems and methods disclosed herein exploit naturally-occurring properties of the communication channel itself, at the physical layer, which allow the sender and the receiver to generate the same key, rather than having the sender transmit the key to the receiver, as occurs in conventional cryptographic solutions. In some embodiments, the distilled key is used by a higher protocol layer to encrypt messages, using, for example, standard secret key encryption algorithms. In other embodiments, the key distilled at both sides is used as a one-time pad to provide perfect secrecy.

FIG. 1 is a block diagram of an environment in which one embodiment of a system and method for providing opportunistic security for physical communication channels is located. A system 100 includes two devices, 110S and 110R, each of which includes a physical layer component 120 and a higher layer component 130. At the physical layer, sender device 110S uses two different time periods to transmit two different kinds of information to receiver device 110R: random symbols 140 are transmitted during some time periods 150; and coding information 160 is transmitted during other time periods 170. Both sender 110S and receiver 110R then use an algorithm to combine coding information 160 with random symbols 140 to distill a key 180.

Once discovered by each side, key 180 is then communicated from physical layer component 120 in each device 110 to the corresponding higher layer component 130 in the same device 110. After using key 180 to encrypt a message, higher layer component 130 in sender device 110S transmits the encrypted message 190 to receiver device 110R. Higher layer component 130 in receiver device 110R uses key 180 to decrypt message 190.

A few examples of higher protocol layer 130 are wired equivalent privacy (WEP) at the media access control (MAC) layer, internet protocol security (IPSec) at the network layer, and secure sockets layer (SSL) at the application layer. However, a person of ordinary skill in the art should understand that the key discovery techniques disclosed herein can be used by any protocol layer 130 above the physical layer. Such a person will also understand that although FIG. 1, and other figures herein, illustrate example scenarios in which device 110S acts as a sender and device 110R acts as a receiver, each device is capable of acting as both a transmitter and a receiver.

Figure 2:
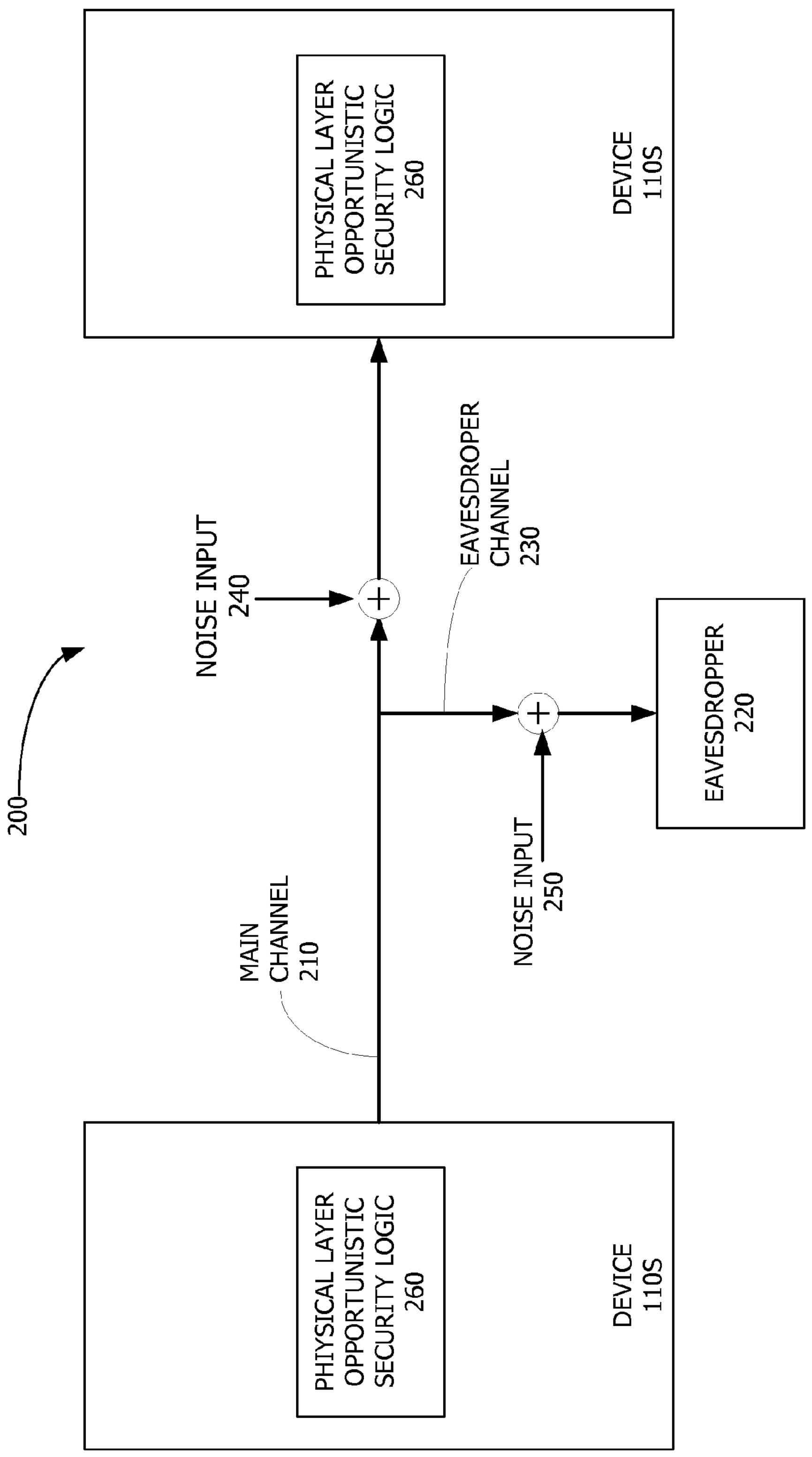
FIG. 2. is a block diagram of the channel between the sender device and the receiver device from FIG. 1, at the physical layer.

The physical layer of the channel between sender device 110S and receiver device 110R will now be described in more detail in connection with the block diagram of FIG. 2. System 200 includes devices 110, which are in communication over a main channel 210. System 200 also includes a third device 220, which is capable of listening to (eavesdropping on) transmissions on main channel 210, using an eavesdropper channel 230. Eavesdropper 220 is passive with respect to main channel 210: eavesdropper 220 does not jam main channel 210, insert bits on main channel 210, etc.

At the physical layer, both channels can be modeled as including noise inputs which affect signal quality: main channel 210 is affected by noise input 240 and eavesdropper channel 230 is affected by noise input 250. One or both of devices 110 has information about the signal quality on eavesdropper channel 230, and in embodiments where only one device 110 has this signal quality information, the information can be communicated to the other device. The techniques disclosed herein also allow for the possibility that eavesdropper 220 has information about the signal quality on main channel 210, but the techniques insure that such information is not sufficient to allow eavesdropper 220 to obtain key 180.

Figure 3:
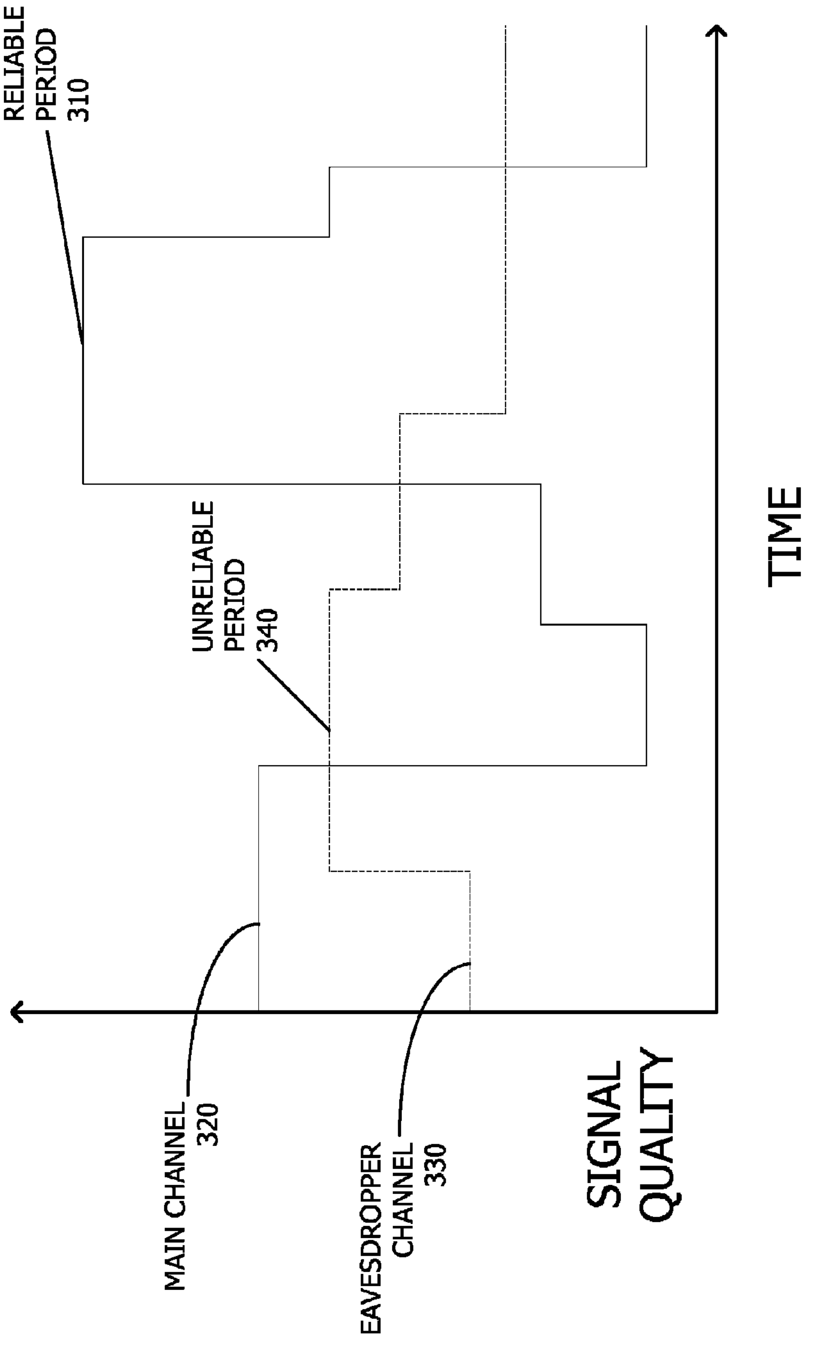
FIG. 3 is a graph of signal quality, over time, on the main channel and the eavesdropper channel from FIG. 1.

Both devices 110 include physical layer opportunistic security logic 260. Logic 260 in 110S cooperates with logic 260 in device 110R to provide security at the physical layer in an opportunistic manner, by exploiting characteristics of noisy channels 210, 230 in combination with information about relative signal quality of channels 210 and 230. These techniques for exploiting channel characteristics will be described in further detail after relative signal quality is discussed connection with FIG. 3, FIG. 3 is a graph of signal quality on main channel 210 and eavesdropper channel 230, over time. As can be seen in FIG. 3, there are time periods 310 during which signal quality 320 on main channel 210 is better than signal quality 330 on eavesdropper channel 230. In this disclosure, these time periods 310 will be referred to as “reliable” or “secret” time periods. There are also periods of time 340 during which the converse is true, and message channel signal quality 320 is worse than wiretap channel signal quality 330. These time periods 340 will be referred to as “unreliable” or “non-secret” time periods. Although this behavior is typical of wireless channels (where fading causes random fluctuations of the signal's amplitude and phase), a person of ordinary skill in the art should recognize that the principles described herein apply to any physical medium which experiences random noise or random fluctuations in signal strength, and thus these two different time periods.

Physical layer opportunistic security logic 260 exploits these varying differences in relative signal quality by communicating two different types of information from sender device 110S to receiver device 110R in these two different time periods. During periods 310 in which message channel signal quality 320 is better than wiretap channel signal quality 330—i.e., during secret periods—random symbols 140 are sent over main channel 210. In the example embodiments described herein, logic 260 in sender device 110S transmits these random symbols 140. In other embodiments, a fourth party (e.g., a broadcast satellite) transmits random symbols 140.

During periods 340 in which message channel signal quality 320 is worse than wiretap channel signal quality 330—i.e., during non-secret periods—coding information 160 is sent over main channel 210. Thus, there is a correspondence between the time periods in FIG. 3 and the time periods in FIG. 1: the secret periods 310 in FIG. 3 correspond to transmit-random-symbols periods 160 in FIG. 1, and the non-secret periods 340 correspond to transmit-coding-information periods 170.

During good-quality-on-message-channel periods 310, receiver device 110R accumulates random symbols 140 but does not use the bits represented by the symbols. After coding information 160 has been communicated during bad-quality-on-message-channel periods 340, sender 110S and receiver 110R combine this additional coding information 160 with the accumulated random symbols 140 to produce key 180 (see FIG. 1).

According to the principles of information-theoretic security, eavesdropper 220 cannot determine key 180 under these conditions. Information-theoretic security principles show that system 200 has positive secrecy capacity during good-quality-on-message-channel periods, or reliable periods, 310. As will be described in further detail below, sender device 110S and receiver device 110R share common randomness through the random symbols 140 transmitted by sender device 110S during reliable periods 310. This transmission results in a set of symbols which is correlated between sender and receiver. Information-theoretic security principles also show that system 200 has zero secrecy capacity during bad-quality-on-message-channel periods, or unreliable periods, 340. Coding information 160 is transmitted during unreliable periods 340, and receiver device 110R uses this coding information 160 to recover the bits represented by already-transmitted random symbols 140. The code is designed to match the secrecy capacity of a particular system: the strength of the code guarantees that legitimate receiver device 110R can recover a sequence of bits identical to those of the transmitter.

Since system 200 has (by definition) zero secrecy capacity during unreliable periods 340, it is possible for eavesdropper 220 to obtain some of the information that is transmitted during these unreliable periods 340. In fact, information theoretic security principles can quantify the maximum amount of information learned by eavesdropper 220, regardless of particular decoding methods which eavesdropper 220 might use. However, an additional step (privacy amplification) taken by sender 110S and receiver 110R after the reconstruction guarantees that eavesdropper 220 can obtain no information from the amplified reconstructed bit sequence. Since the amplified and reconstructed bit sequence can be used as a key 180 by both sides, it follows that the techniques disclosed herein allow key 180 to be generated by both sides in a manner that precludes eavesdropper 220 from obtaining key 180, and thus the techniques provide secure communication.

Figure 4:
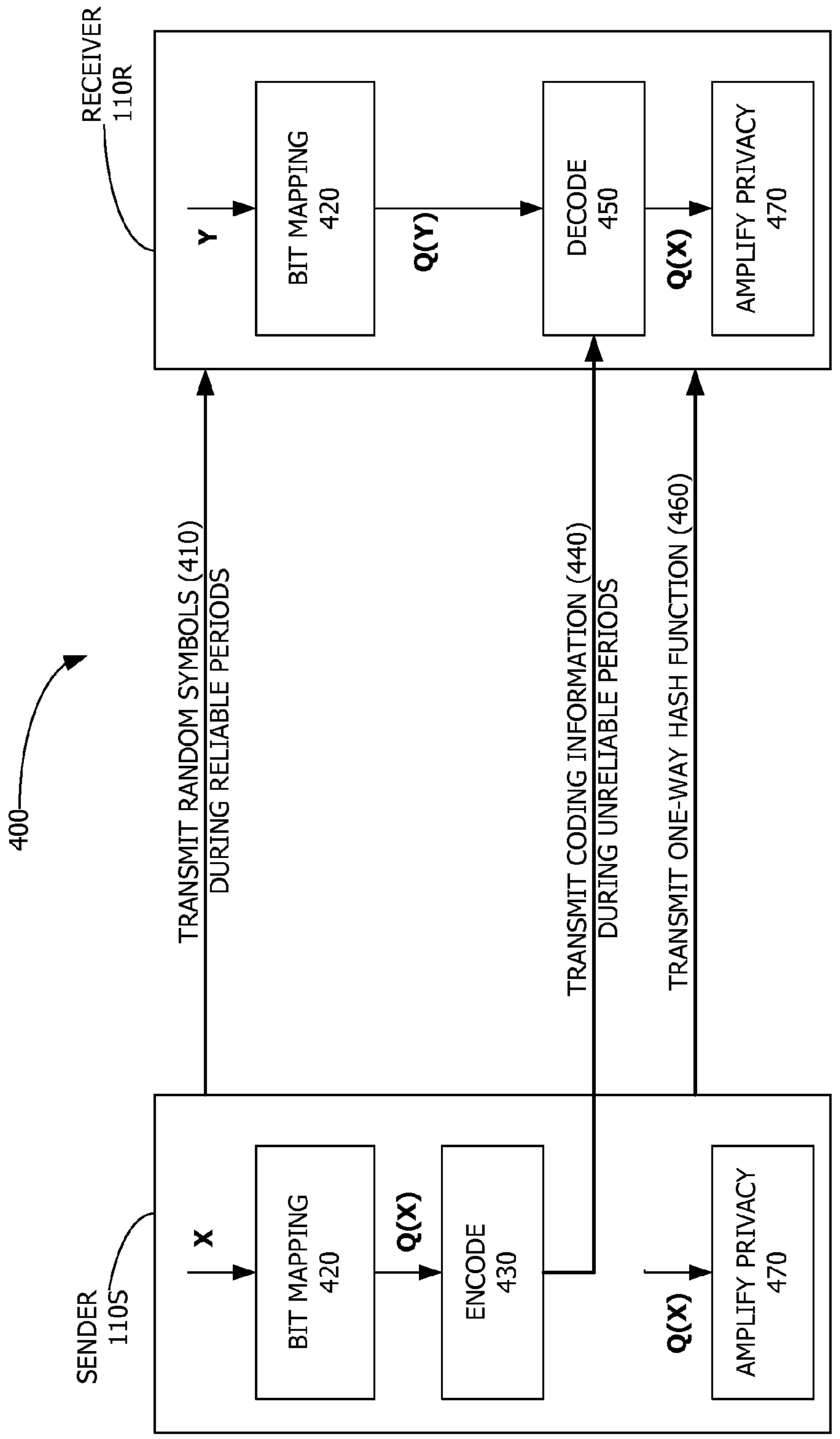
FIG. 4 is a sequence diagram of one embodiment of the logic for providing opportunistic security for physical communication channels from FIG. 1.

FIG. 4 is a sequence diagram of one embodiment of physical layer opportunistic security logic 260. Sequence 400 starts when logic 260 detects that message channel signal quality 320 is better than wiretap channel signal quality 330 (i.e., during a reliable period 310). A person of ordinary skill in the art should be familiar with detection using standard channel estimation techniques, such as pilot-assisted symbol estimation, etc. During reliable periods 310, sender 110S transmits (410) over main channel 210 a series of symbols (X) selected at random from a symbol set. In some embodiments, the symbols are quadrature amplitude modulation (QAM) symbols.

After the random symbol transmission 410, sender 110S and receiver 110R share a set of correlated continuous-valued symbols. Since continuous values are used, extracting a sequence of common bits from these continuous sequences is not straightforward, and standard coding techniques cannot be applied directly. Therefore, the systems and methods disclosed herein use multilevel coding. Multilevel coding quantizes the continuous symbols and then assigns a binary label to each of the quantized values. Although basic principles of multilevel coding have been proposed for use in general communication, here the use of multilevel codes is extended to the reconciliation of correlated sequences. In some embodiments, the number of symbols, the amplitudes of the symbols, and the probability distribution of the symbols are all optimized so that information is transmitted at a rate close to channel capacity, while still satisfying the power constraint of main channel 210.

Both sender 110S and receiver 110R map (420) the received symbols (X and Y respectively) to a bit sequence. However, since some amount of noise may be present on main channel 210, the bit sequence Q(Y) produced by receiver 110R may differ from the bit sequence Q(X) produced by sender 110S. That is, bit sequence Q(Y) may contain errors.

When logic 260 detects that message channel signal quality 320 is worse than wiretap channel signal quality 330 (i.e., during unreliable periods 340), sender 110S generates (430) error-correcting (coding) information 160 from the bit sequence Q(X), and transmits (440) coding information 160 over main channel 210. During these unreliable periods 340, receiver 110R decodes (450) coding information 160 and uses this information to recover or reconcile the original bit sequence Q(X). In some embodiments, coding information 160 takes the form of a low-density parity-check code (LDPC). In other embodiments, coding information 160 takes the form of a turbo code.

After reconciliation, sender 110S communicates (460) a random function over main channel 210, and each side applies (470) that random function to reconciled bit sequence Q(X). This application is also known as privacy amplification, and the result is secure key 180. In some embodiments, this random function is a universal hash function, with the property of producing an output sequence that is in general much smaller than the input sequence.

Notably, the reconciliation and privacy amplification steps, using coding information 160 already transmitted during a may be conducted over several disjoint unreliable periods 340. Furthermore, in some embodiments coding information 160 is transmitted in some reliable periods 310 as well as unreliable periods 340, to ensure some minimum amount of time is available for processing random symbols are processed.

FIGS. 5A-E are block diagrams illustrating an example scenario with sender 110S, receiver 110R, and eavesdropper 220. Sender 110S and receiver 110R communicate over main channel 210, which is subject to noise input 240. Eavesdropper 220 listens on eavesdropper channel 230, which is subject to noise input 250.

Figure 5A:
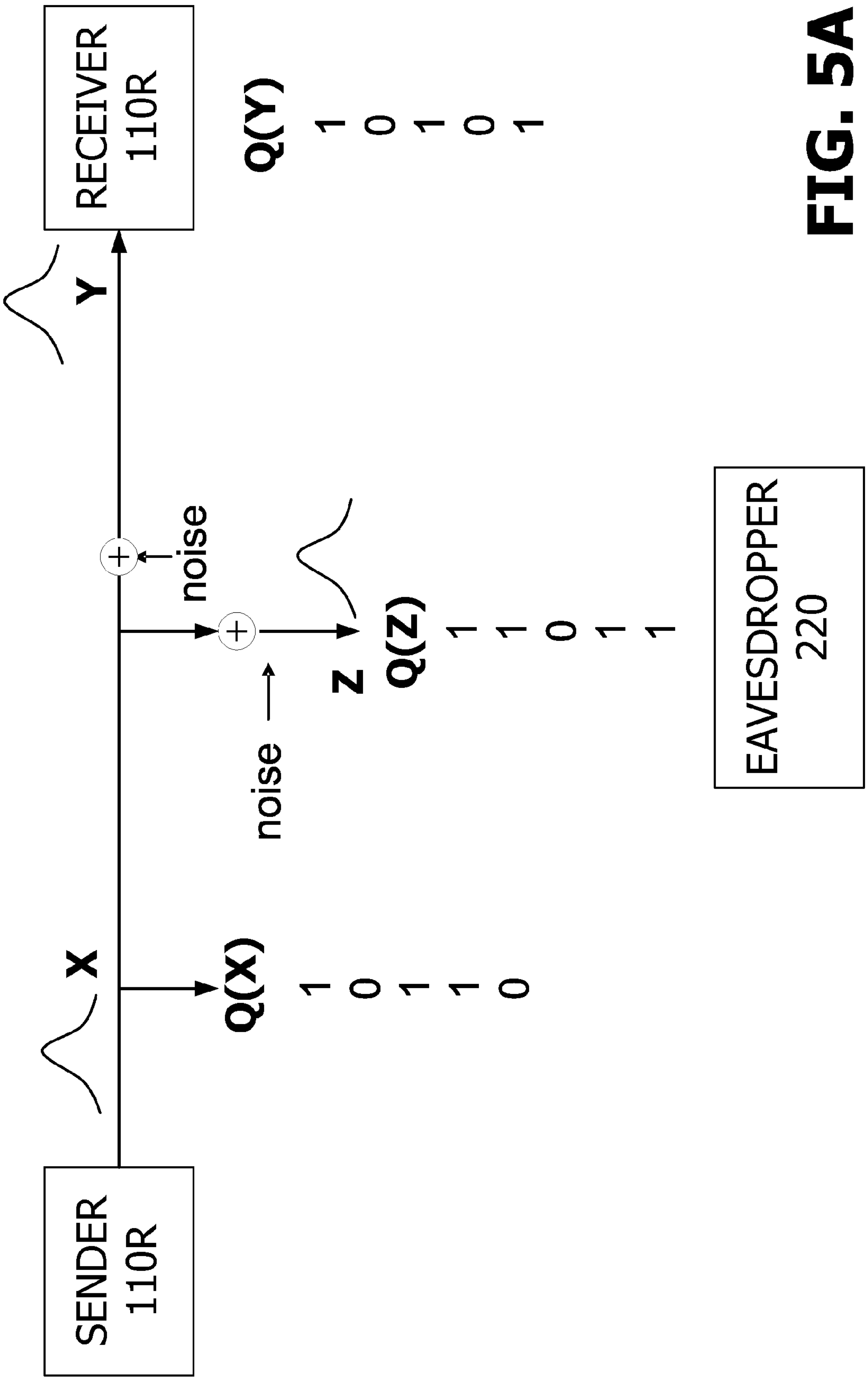
FIGS. 5A-E are block diagrams illustrating an example scenario with the sender, the receiver, and the eavesdropper from FIG. 1.

FIG. 5A illustrates the behavior of the parties during reliable periods 310. As described earlier, sender 110S transmits over main channel 210 a sequence of random symbols 140. In this diagram, the symbol waveforms as seen by sender 110S, receiver 110R, and eavesdropper 220 are shown as X, Y, and Z, respectively, while the sequence of quantized bits detected by the three parties are shown as Q(X), Q(Y) and Q(Z), respectively. In this example, the originally transmitted bit sequence Q(X) is 10110. Since main channel 210 is subject to noise, the sequence Q(Y) seen by receiver 110R is slightly different: 10101. Since transmission of random symbols occurs during reliable periods 310, in which message channel signal quality 320 is better than wiretap channel signal quality 330, the sequence Q(Z) seen by eavesdropper 220 will, on average, contain more errors. Here, Q(Z) is 11011, which contains three bit errors as compared to two bit errors in Q(Y).

Figure 5B:
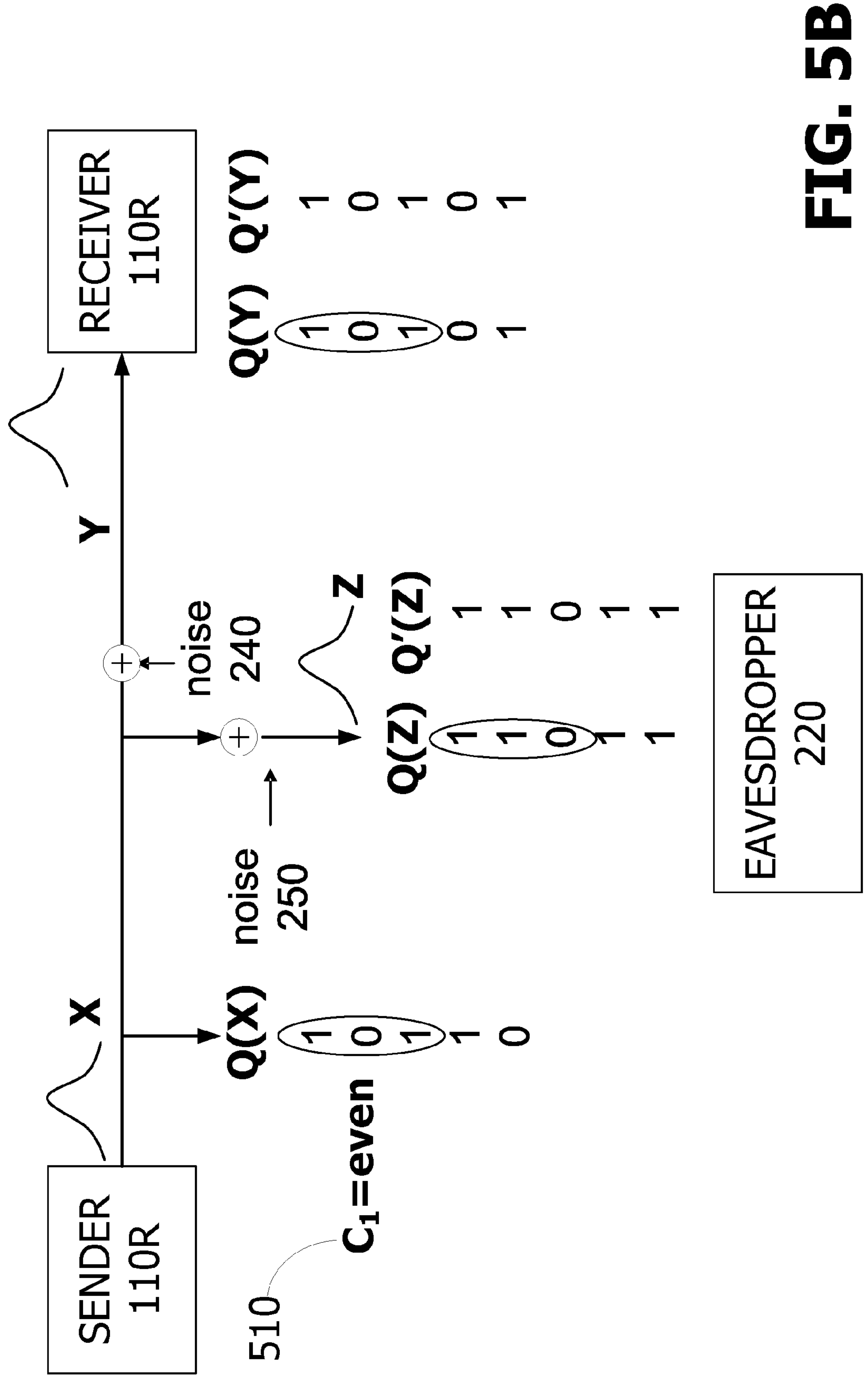

FIG. 5B illustrates the behavior of the parties during unreliable periods 340. As described earlier, sender 110S transmits coding information 160 which allows receiver 110R to reconstruct the original bit sequence Q(X) from the received—and possibly errored—bit sequence Q(Y), while also preventing eavesdropper 220 from reconstructing the original sequence. In this example, the error correcting code is a single parity bit protecting a group of three bits, so the transmitted code C1 (510) indicates even parity. The first three bits in Q(Y) were received by receiver 110R with even parity, so no error is detected by receiver 110R and the first three bits in Q(Y) remain as is. Eavesdropper 220 also receives code C1, but the bits in Q(Z) contain more errors, since wiretap channel signal quality 330 was worse when Q(Z) was received. Thus, the first three bits in Q(Z) still contain errors, even after code C1 is received.

Figure 5C:
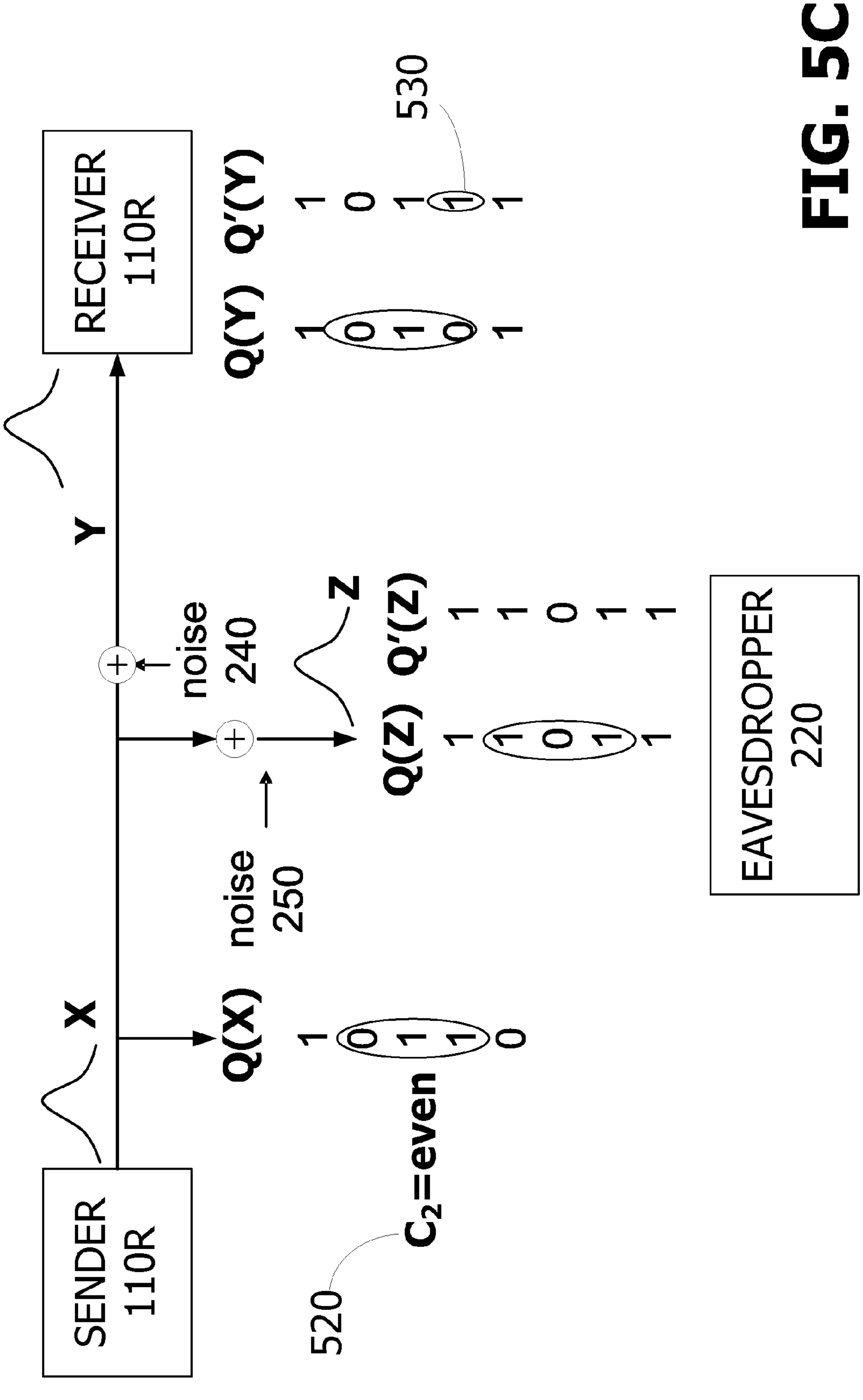
Figure 5D:
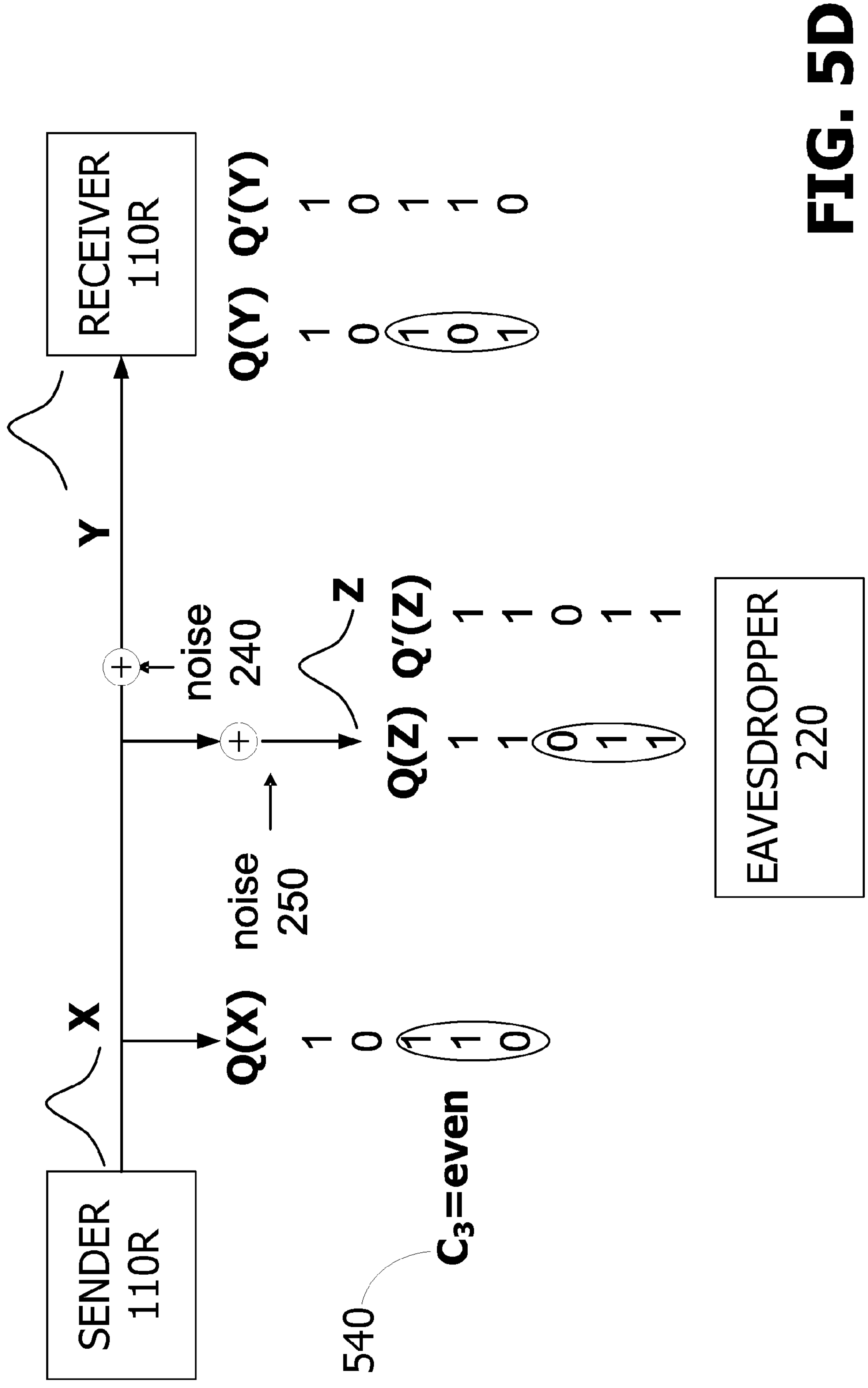

The reconciliation phase continues as illustrated in FIG. 5C. The transmitted code C2 (520) also indicates even parity. Here, the first second bits in Q(Y) were received with odd parity, so an error is detected and the second three bits in Q(Y) are corrected to 010. The reconciliation phase is completed in FIG. 5D, where transmitted code C3 (530) indicates even parity, and the last three bits in Q(Y) remain unchanged. As before, Q(Z) as seen by eavesdropper 220 still contains errors, even after all three codes C1, C2 and C3 are received.

Figure 5E:
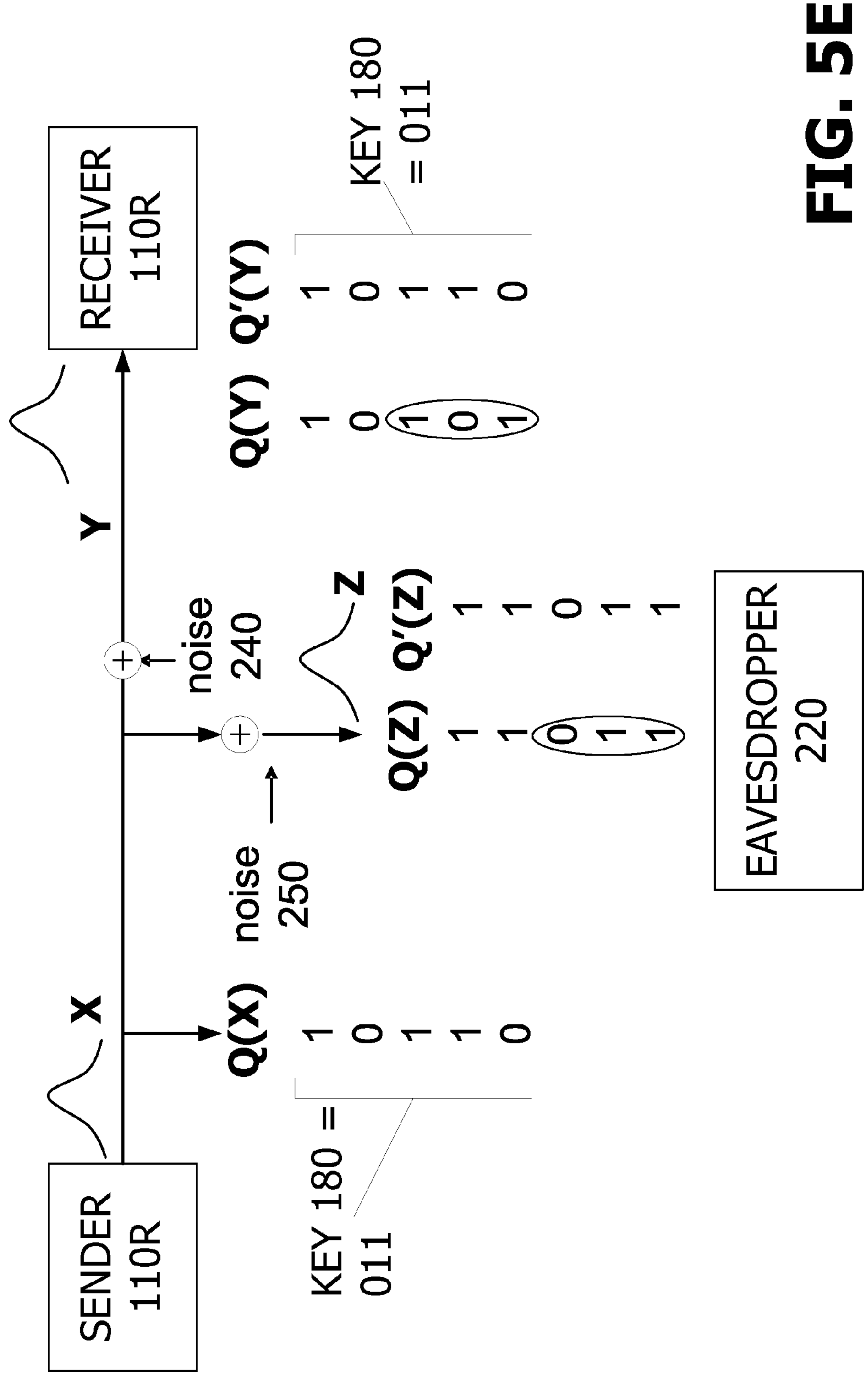

The final phase for key generation is illustrated in FIG. 5E. At the end of the reconciliation function, the bit sequence Q(Z) is still correlated with sequence Q(X), which means eavesdropper 220 can guess some information about original bit sequence Q(X). To amplify the amount of privacy, sender 110S broadcasts a random function, which is received by receiver 110R and eavesdropper 220. Each party applies the random function to Q(X), Q(Y), and Q(Z), respectively. Application of the random function by sender 110S and receiver 110R produces the same key 180, while eavesdropper 220 produces a different key 540. Information-theoretic security principles guarantee that each bit of the eavesdropper-generated key 560 has a particular degree of independence from corresponding bits of key 180. That is, the error correcting code and the privacy amplification function are designed to guarantee that key 540 is as independent of key 180 as is desired, which means that eavesdropper 220 can extract no information about key 180.

Figure 6:
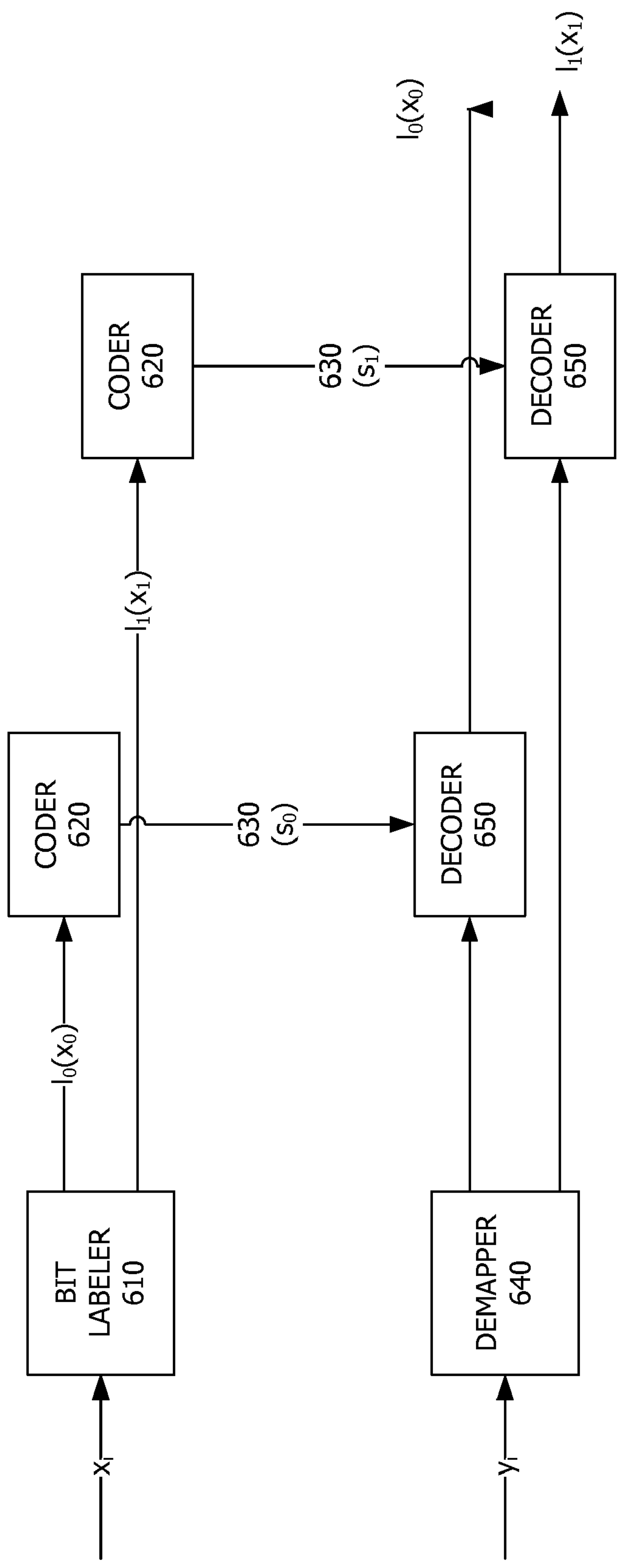
FIG. 6 is a block diagram of the multilevel coder and encoder used by some embodiments of the logic for providing opportunistic security for physical communication channels from FIG. 1.

FIG. 6 is a block diagram of the multilevel coder and encoder used by some embodiments of physical layer opportunistic security logic 260. As described earlier, noise channel 240 introduces discrepancies between the received data as seen by receiver 110R and the random symbols sent by sender 110S. Sender 110S generates reconciliation, or coding, information 160 to correct these discrepancies. Logic 260 within sender device 110S includes a bit labeler 610 which receives transmitted symbols X and assigns an m-bit binary label to each symbol X. A multilevel coder 620 (e.g., a LDPC coder) successively computes a series of m syndromes s. Syndromes s are transmitted on main channel 210 during reliable periods 310.

Logic 260 within receiver device 110R recovers syndromes s. Random symbols Y (previously received during unreliable periods 340) are processed by a demapper 630 to produce a bit sequence which, in combination with syndromes s, is decoded by a multistage decoder 640. Thus, decoder 640 uses syndromes s as side information.

Figure 7:
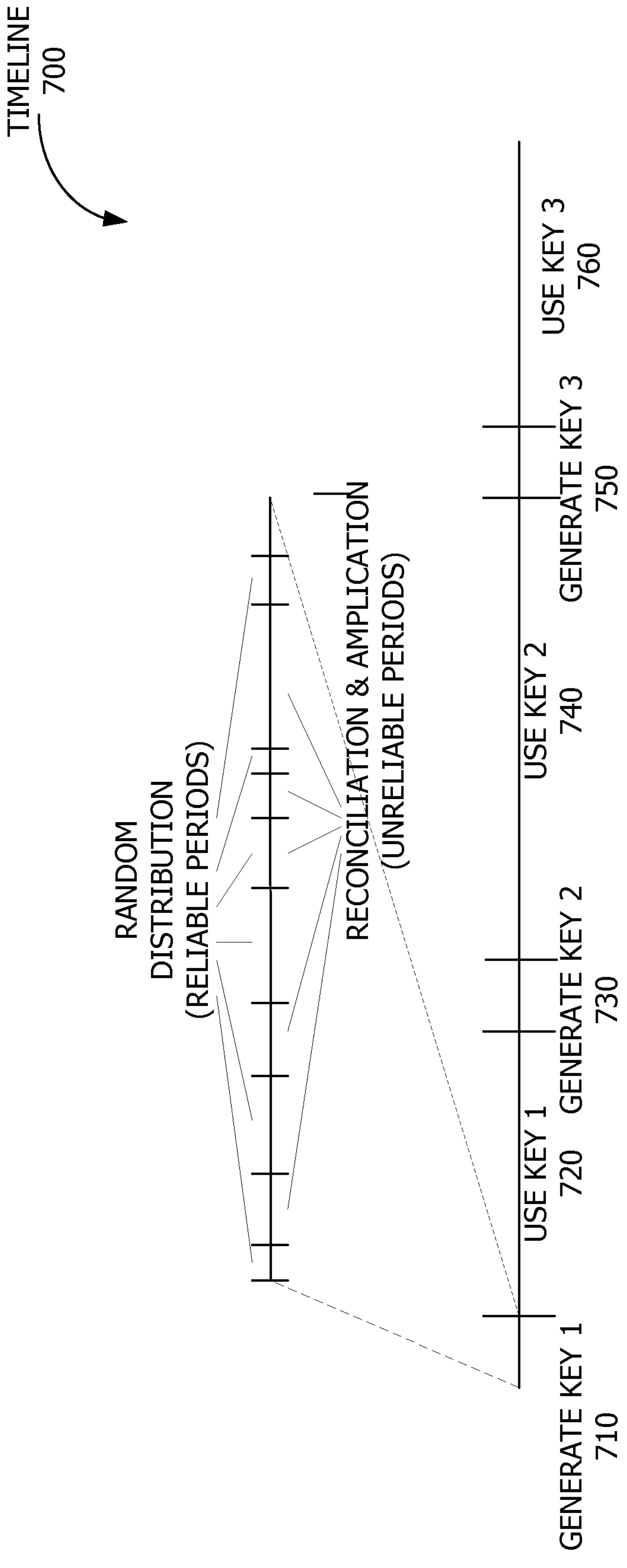
FIG. 7 is a diagram illustrating a timeline for generating and using multiple keys over time.

FIG. 7 is a diagram illustrating a timeline 700 for generating and using multiple keys over time. A time period 710 in which a first key is generated is followed by another time period 720 in which the first key is used for encryption. A second key is generated in time period 730, and this second key is used during time period 740. Similarly, a third key is generated in time period 750, and this third key is used during time period 760. As explained earlier, each of key generation periods 710, 730, 750 is itself composed of reliable sub-periods during which random symbols are distributed and unreliable sub-periods during which reconciliation occurs. In this manner, key 180 is periodically refreshed, so that even if eavesdropper 220 guesses one instance of the key, that key instance is in use for only a short period of time.

In some embodiments, the frequency of key generation is based on characteristics of main channel 210, eavesdropper channel 230, or both (e.g., the ratio of reliable periods 310 to unreliable periods 340, the ratio of average main channel signal quality to average eavesdropper channel signal quality, or the absolute signal quality of either channel). In some embodiments, physical layer component 120 (see FIG. 1) generates the key in response to a request by higher-layer component 130. In other embodiments, physical layer component 120 generates the key of its own accord, without a request by higher-layer component 130.

Figure 8:
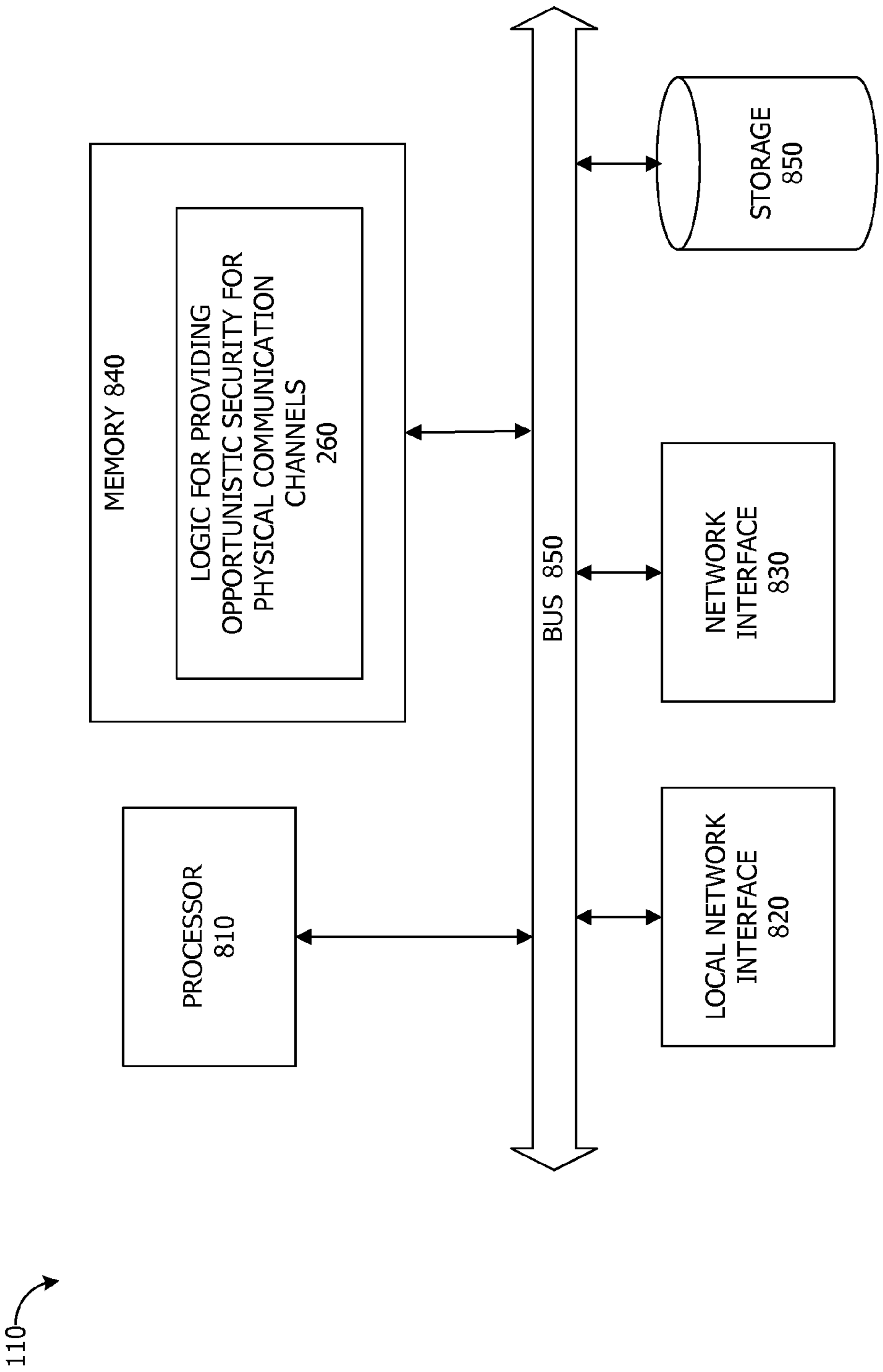
FIG. 8 is a hardware block diagram of the device from FIG. 1.

FIG. 8 is a hardware block diagram of device 110 in accordance with one embodiment of the systems and methods of providing opportunistic security for physical communication channels. Device 110 contains a number of components that are well known in the art of data communications, including a processor 810, a network interface 820, memory 830, and non-volatile storage 840. These components are coupled via bus 1850. A person of ordinary skill in the art should understand that the network interface 820 may support different medias, speeds, etc. Examples of non-volatile storage include, for example, a hard disk, flash RAM, flash ROM, EEPROM, etc. Memory 830 contains physical layer opportunistic security logic 260 from FIG. 1, which programs or enables processor 810 to perform the functions of logic 260. Omitted from FIG. 8 are a number of conventional components, known to those skilled in the art, that are not necessary to explain the operation of device 110.

Device 110 can be implemented in software, hardware, or a combination thereof. In some embodiments, the device, system, and/or method is implemented in software that is stored in a memory and that is executed by a suitable microprocessor, network processor, or microcontroller situated in a computing device. In other embodiments, the device, system and/or method is implemented in hardware, including, but not limited to, a programmable logic device (PLD), programmable gate array (PGA), field programmable gate array (FPGA), an application-specific integrated circuit (ASIC), a system on chip (SoC), and a system on packet (SoP).

Device 110 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A method for opportunistic secure communication on a main channel between a sender device and a receiver device when an eavesdropper device is listening on an eavesdropper channel, the method comprising:

transmitting, in a first time period in which signal quality on the main channel is better than signal quality on the eavesdropper channel, symbols that are randomly selected from a set of symbols;

transmitting, in a second time period in which signal quality on the main channel is not better than signal quality on the eavesdropper channel, coding information associated with the randomly selected symbols;

reconciling the randomly selected symbols using the coding information;

determining when signal quality on the main channel is better than signal quality on the eavesdropper channel;

responsive to the determination, transmitting the symbols that are randomly selected from a set of symbols;

determining when signal quality on the main channel is not better than signal quality on the eavesdropper channel; and responsive to the determination, transmitting the coding information associated with the randomly selected symbols.

2. The method of claim 1, further comprising:

generating the coding information for transmission in the second time period with a multilevel code.

3. The method of claim 1, further comprising:

generating the coding information for transmission in the second time period with a low-density parity-check (LDPC) code.

4. The method of claim 1, further comprising:

mapping the randomly selected symbols to a bit sequence; and generating the coding information for transmission in the second time period from the bit sequence.

5. The method of claim 1, wherein reconciling the randomly selected symbols using the coding information produces a reconciled bit sequence, the method further comprising:

applying a universal hash function to the reconciled bit sequence to distill a secure key.

6. The system of claim 1, further comprising:

generating the coding information for transmission in the second time period with a multilevel code.

7. The system of claim 1, further comprising:

mapping the randomly selected symbols to a bit sequence; and generating the coding information for transmission in the second time period from the bit sequence.

8. The system of claim 1, wherein the means for reconciling the randomly selected symbols using the coding information produces a reconciled bit sequence, the system further comprising:

applying a universal hash function to the reconciled bit sequence to distill a secure key.

9. The method of claim 1, further comprising:

producing the secure key by applying the universal hash function to the reconciled bit sequence.

10. The method of claim 1, wherein the coding information comprises error-correcting information.

11. The method of claim 1, wherein the coding information comprises at least one parity bit.

12. A system of opportunistic secure communication on a main channel between a sender device and a receiver device when an eavesdropper device is listening on an eavesdropper channel, the system comprising:

transmitting, in a first time period in which signal quality on the main channel is better than signal quality on the eavesdropper channel, symbols that are randomly selected from a set of symbols;

transmitting, in a second time period in which signal quality on the main channel is not better than signal quality on the eavesdropper channel, coding information associated with the randomly selected symbols;

reconciling the randomly selected symbols using the coding information;

determining when signal quality on the main channel is better than signal quality on the eavesdropper channel;

responsive to the determination, transmitting the symbols that are randomly selected from a set of symbols;

determining when signal quality on the main channel is not better than signal quality on the eavesdropper channel; and responsive to the determination, transmitting the coding information associated with the randomly selected symbols.

13. A method for opportunistic secure communication on a main channel between a sender device and a receiver device when an eavesdropper device is listening on an eavesdropper channel, the method comprising:

transmitting, in a first time period, symbols that are randomly selected from a set of symbols;

transmitting, in a second time period, coding information associated with the randomly selected symbols;

reconciling the randomly selected symbols using the coding information, wherein the first and second time periods are distinguished by relative signal quality on the main channel and on the eavesdropper channel;

determining when signal quality on the main channel is better than signal quality on the eavesdropper channel;

responsive to the determination, transmitting the symbols that are randomly selected from a set of symbols;

determining when signal quality on the main channel is not better than signal quality on the eavesdropper channel; and responsive to the determination, transmitting the coding information associated with the randomly selected symbols.

14. The method of claim 13, further comprising:

generating the coding information for transmission in the second time period with a multilevel code.

15. The method of claim 13, further comprising:

mapping the randomly selected symbols to a bit sequence; and generating the coding information for transmission in the second time period from the bit sequence.

16. The method of claim 13, wherein reconciling the randomly selected symbols using the coding information produces a reconciled bit sequence, the method further comprising:

applying a universal hash function to the reconciled bit sequence to distill a secure key.

17. The method of claim 13, wherein reconciling the randomly selected symbols using the coding information produces a reconciled bit sequence, the method further comprising:

applying a universal hash function to the reconciled bit sequence to distill a secure key.

18. A system for opportunistic secure communication on a main channel between a sender device and a receiver device when an eavesdropper device is listening on an eavesdropper channel, the system comprising:

a physical layer component configured to distill a key from symbols and coding information that are presented on the main channel during two different time periods, the two different time periods distinguished by relative signal quality on the main channel and on the eavesdropper channel;

a higher-than-physical-layer component configured to encrypt a message using the distilled key;

transmitting, in the first time period, symbols that are randomly selected from a set of symbols;

transmitting, in the second time period, coding information associated with the randomly selected symbols; and reconciling the randomly selected symbols using the coding information.

19. The system of claim 18, wherein the physical layer component is further configured to:

generating the coding information with a low-density parity-check (LDPC) code.

20. The system of claim 18, wherein the higher-than-physical layer component is further configured to request the physical layer component to distill the key.

21. A system for opportunistic secure communication on a main channel between a sender device and a receiver device when an eavesdropper device is listening on an eavesdropper channel, the system comprising:

a physical layer component configured to generate a first key in a first generation period and to generate a second key during a second generation period;

a higher-than-physical-layer component configured to encrypt in a first encryption period with the first key and to encrypt in a second encryption period with the second key, wherein the physical layer component is further configured to generate each of the first and the second keys from symbols and coding information that are presented on the main channel during two different sub-periods contained within the respective generation periods, the two different sub-periods distinguished by relative signal quality on the main channel and on the eavesdropper channel;

transmit, in the first sub-period, symbols that are randomly selected from a set of symbols;

transmit, in the second sub-period, coding information associated with the randomly selected symbols; and reconcile the randomly selected symbols using the coding information.

22. The system of claim 21, wherein the higher-than-physical layer component is further configured to request the physical layer component to generate the first key.

23. The system of claim 21, wherein the higher-than-physical layer component is further configured to request the physical layer component to generate the first key, wherein frequency of the request is based on characteristics of the main channel.

24. The system of claim 21, wherein the physical layer component is further configured to generate the first key without a request from the higher-than-layer physical component.

* * * * *

UNITED STATES PATENT AND TRADEMARK OFFICE

CERTIFICATE OF CORRECTION

PATENT NO. : 8,213,616 B2
APPLICATION NO. : 12/441737
DATED : July 3, 2012
INVENTOR(S) : Matthieu Ratislav Bloch et al.

It is certified that error appears in the above-identified patent and that said Letters Patent is hereby corrected as shown below:

Column 1, after paragraph [001] and before “FIELD OF THE DISCLOSURE”, insert:
-- This invention was made with Government support under Grant Number CCF-0431031, awarded by the National Science Foundation. The Government has certain rights in the invention. --

Signed and Sealed this
Fourth Day of September, 2012

David J. Kappos
*Director of the United States Patent and Trademark Office*